July 28, 1959 F. H. RAYMOND ET AL 2,897,359

ELECTRONIC SWITCHING MEANS

Filed Oct. 6, 1954 2 Sheets-Sheet 1

INVENTORS.
FRANCOIS HENRI RAYMOND
AND MONIQUE BERTHE LILAMAND
BY Theodore [signature]
ATTORNEY

ELECTRONIC SWITCHING MEANS

Filed Oct. 6, 1954 2 Sheets-Sheet 2

INVENTORS,
FRANÇOIS HENRI RAYMOND
AND MONIQUE BERTHE LILAMAND
BY
Theodore Haefner
ATTORNEY United States Patent Office
2,897,359
Patented July 28, 1959

2,897,359

ELECTRONIC SWITCHING MEANS

Francois Henri Raymond, Saint-Germain-en-Laye, and Monique Berthe Lilamand, Paris, France, assignors to Societe d'Electronique et d'Automatisme, Courbevoie, France Application October 6, 1954, Serial No. 460,722

Claims priority, application France November 28, 1953

22 Claims. (Cl. 250—27)

The present invention relates to electronic switching means for use mainly in analogue computers, function simulators, analogue multipliers and the like.

It more particularly relates to that kind of electronic switch which comprises a unidirectionally conducting element such as a vacuum or crystal diode connected at one of its electrodes to a point of a transmission path for an electric signal or voltage, and connected at its other electrode to a biasing point. In such a condition, this signal or voltage is normally transmitted over that transmission path whenever the diode element is non-conducting or blocked; however, when the diode is conducting, a biasing voltage is applied to that point of the transmission path so that, if this biasing voltage is properly calibrated with respect to the electric signal or voltage in the transmission path, only a residual voltage or signal is left in this path for further transmission from that branching point. When the transmitted signal for instance consists of a fluctuating amplitude D.C. voltage, this residual voltage will consist at this point of voltage fluctuations on each side of the biasing voltage, with the reduced value being determined by the transfer characteristic presented by the diode element itself.

This kind of electronic switch can be controlled in either one of the two following manners:

Externally, whereby the biasing voltage is switched over from one value for which the diode element is blocked, to another value for which the diode element is made conducting. These values are determined with respect to the amplitude value of the electric voltage or signal the transmission of which is to be controlled by the switch, namely, the two values of the biasing voltages are selected on either side of the value or range of variations in amplitude of the electric voltage or signal.

Alternatively, switching is controlled by the amplitude change of the signal itself, the biasing voltage being fixed and selected at a predetermined value within the range of variation of the general voltage level.

Usually such an electronic switch is inserted in a transmission path by inserting in this path a series resistance attenuator and connecting a selected intermediate point of this attenuator to the diode element.

This kind of electronic switch includes a series resistance which at one end or terminal receives an applied signal. The suitably alternated signal is derived from the other end or terminal of the attenuator.

A diode element is connected at one of its electrodes to an intermediate point of the attenuator, and at its other electrode to a biasing point.

The terminal at the output end of the attenuator is normally connected to the input of a high gain amplifier provided with a negative feedback loop. According to the nature of the impedance element or network within such loop, the output signal from this amplifier will accurately follow a predetermined law of variation with respect to the variation of its input signal. This, broadly speaking, will be the case for all electronic switches of the kind specified used with or in analogue computation devices.

For such uses, the residual voltage must be made substantially zero or, at least, easily to be compensated by means of a fixed compensating voltage of opposite polarity which may be introduced either at the output end or at any intermediate point of the attenuator. In general this will not be the case with known electronic switches of the kind specified. The fluctuations of the residual voltage, when the switch operates on amplitude fluctuating D.C. signals, for instance, remain too wide to make possible such cancellation or compensation in the conducting periods of the diode element of such known switching apparatus.

One object of the invention, therefore, is to provide an improvement in electronic switches of the kind specified permitting a residual voltage to be obtained which is substantially zero, or at least easily to be compensated.

Further, according to the invention, there is provided in an electronic switch of the kind specified, at least a second diode element connected at one of its electrodes to a second point of the resistance attenuator. This second point of connection is located below the first one when looking in the direction of transmission. The other electrode of the second diode is connected to a second biasing point, the control arrangement being such that both diode elements are controlled substantially simultaneously and the voltage passed through the second element, when conducting, is adjusted to oppose the attenuated residual voltage from the first element at its own point of connection, in such a manner that the final residual output voltage from the attenuator is substantially zero or, at least, of such a narrow width of fluctuation range that it may be considered as compensated when opposed to a fixed compensating voltage thereat, or at a point below the point of connection of the second diode element.

A more specific object of the invention is to combine an electronic switch of the kind specified with at least one second diode element connected at one of its electrodes to a point of connection between the point of connection of the first diode and the output end of the attenuator, the second diode element having its other electrode connected to a biasing point, and the biasing voltages being such that the diode elements are controlled substantially simultaneously from and to their conducting states, and when the diode elements are conducting the second diode element operates to so reduce the fluctuation of the residual voltage in the attenuator derived from the first diode element, that the final residual voltage derived from the attenuator is substantially constant, or so nearly constant that it can be substantially compensated by the application of a compensating voltage of constant value.

These and other objects of the invention will be described in detail with reference to the accompanying drawings, wherein.

Figure 1:
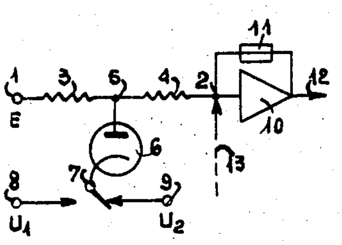
Fig. 1 shows one form of an electronic switch of the kind specified, together with a high gain negative feedback amplifier therefor.

An electronic switch of the kind specified is shown in Fig. 1 and comprises, between the terminals 1 and 2, a series resistance attenuator consisting of 2 serially connected resistors 3 and 4. Junction point 5 of these resistors is connected to the anode of diode 6, the cathode of which is connected to a terminal 7.

Terminal 7 is shown to be connected to the armature of a change-over contact receiving at 8 a voltage U1 and at 9 another voltage U2. Normally, the practical realization of such a change-over contact will be a switch of the electronic type, as will be described further below, with reference to Figs. 6 and 7.

According to Fig. 1, a high gain D.C. amplifier 10 has its input connected to terminal 2 and is provided with a negative feedback impedance 11 extending from its output 12 to terminal 2. At 13 there is shown a multiplexing arrow to indicate that several additional attenuators may be connected, if desired, to terminal 2, and in this case amplifier 10 will operate to sum up the voltages brought to its input from all such attenuators. In case impedance 11 consists of a resistance, the signal derived at 12 will reproduce the overall input signal. In case impedance 11 consists of a capacity, the derived signal will be proportional to the integral value of this overall input signal; and so forth. It is however understood that the improvements on the electronic switch in accordance with the invention are by no means dependant upon the nature of the amplifier or any other circuit to which output terminal 2 of the switch is connected.

Figure 3:
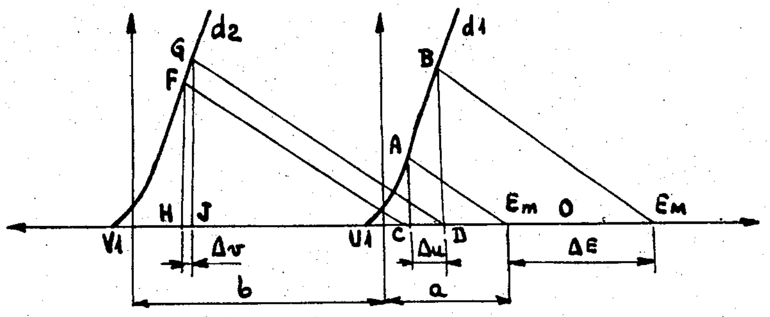
Figs. 3 and 5 are graphs explaining certain operational features of the invention.
Figure 5:
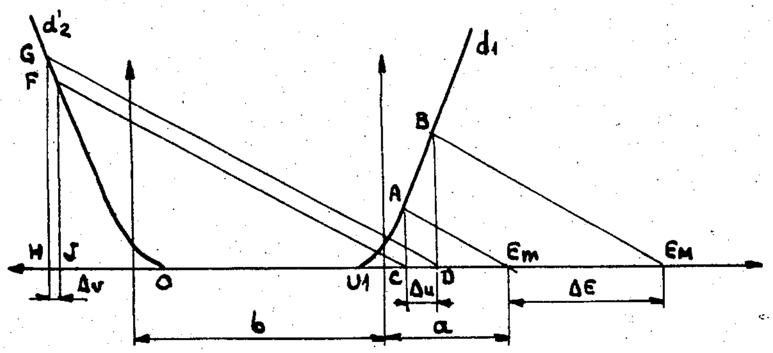

In considering Figs. 3 and 5 the input voltage E of the attenuator is assumed to be an amplitude varying D.C. signal with a range of variations between two possible values $E_m$ and $E_M$, which may be on each side of the zero point, as in Fig. 3, or on one side only of this point, as in Fig. 5. In the right-hand portion of Figs. 3 and 5 the voltages are shown as seen from point 5.

When the voltage at point 7 is U2, the diode 6 is not conducting as this value U2 is higher than the maximum value $E_M$ seen from point 5. On the other hand when, the voltage at point 7 is at its value U1, which is lower than $E_M$ by an arbitrary interval or spacing *a*, diode 6 becomes conducting. At point 5 there results a residual voltage U which can vary between limits defined by the projections on the abscissa axis of the intersection points A and B of the respective load characteristics of diode 6 corresponding to signal values $E_m$ and $E_M$, with the transfer characteristic proper of this diode 6. These projection points, C and D, define a range of fluctuation $\Delta u$ of the residual voltage at point 5.

In spite of the attenuation due to resistance 3, the range $\Delta E$ of the input signal, as seen from point 5, cannot be so reduced that the residual range of variation $\Delta u$ itself is so small that a compensation voltage of constant value and of a polarity opposite to that of the residual voltage could be set, at a point of the attenuator. This will be desirable especially in analogue computation circuits wherein a high accuracy of results is required.

Figure 2:
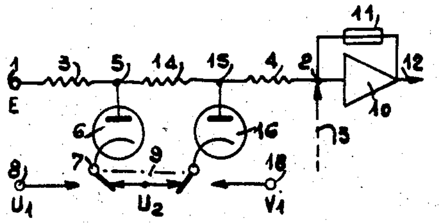
Figs. 2 and 4 represent two embodiments of electronic switching apparatus according to the invention.

In accordance with the invention such as illustrated in Fig. 2, a further resistance 14 is inserted between resistances 3 and 4—with suitable redimensioning of these three resistors to a predetermined attenuation value. Junction point 15 of resistances 14 and 4 is connected to an electrode of a second diode element, for instance to the anode of a diode 16, Fig. 2. Furthermore the cathode of diode 16, at point 17, is connected to a further inverter or changeover contact, such that when voltage U2 is applied to the cathode of diode 6 it is also applied to the cathode of diode 16 and, when the voltage U1 is applied to the cathode of diode 6, there is applied to the cathode of diode 16 a voltage V1 of such a value as to render diode 16 conducting substantially simultaneously with diode 6. Under these circumstances the overall operation of the electronic switch remains unchanged when both diodes are conducting, even if instead of voltage U2 a different voltage V2 is applied to the cathode of diode 16, V2 being of a higher value than the signal voltage corresponding to $E_M$, as seen from the terminal 15.

The overall operation, however, is modified as follows when both diodes are conducting: At point 5 a residual voltage appears with a variation range of $\Delta u$, see right-hand portion of Fig. 3. This residual voltage is attenuated through 14, and it is this attenuated voltage which then occurs at point 15. Since however the diode 16 presents a cathode biasing voltage of V1, spaced apart along the abscissa axis from bias voltage U1 of diode 6 by *b*, and if both transfer characteristics *d*1 and *d*2 of the diodes are considered as substantially identical and having the same slopes of load characteristics, a further residual voltage appears at point 15, and the range of variation $\Delta u$ is determined by the projection points H and J of the two intersection points F and G of curve *d*2 with the load characteristics from points C and D, the limit values of the former range of variation $\Delta u$. It is apparent that the residual voltage range, $\Delta v$, is narrower than the range $\Delta u$. This reduction will depend, firstly, on the value of resistance 14 and, secondly, on the spacing $a+b$ with respect to the former spacing *a*, i.e. the reduction will depend on the choice of V1 with respect to U1. Obviously, the graph does not take into account the attenuation introduced by 14 so that V1 appears more negative than U1 while the reverse is true in actual practice. Spacings A and $a+b$ may be considered as plotted with respect to different values of $E_M—E_m$, as seen from the point 5, for *a*, and from point 15, for *b*. At 15, the difference is C—D.

It will be noted that the range of variation $\Delta v$ can thus be obtained at such reduced value, considering the control voltages of the two diodes and the attenuation characteristics of the network, that a compensating voltage of the mean value of $\Delta v$ but of opposite polarity, may be introduced at will for substantially cancelling the residual voltage, as seen from output terminal 2.

Figure 4:
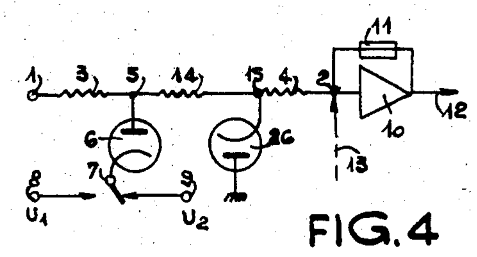

As an alternative, the second diode can be provided with a direction of conduction reversed with respect to that of the first diode. This is shown in Fig. 4, wherein second diode 26 has its cathode connected to point 15 of the attenuator and its anode connected to a fixed bias, for instance the earth potential. In Figs. 4 and 5 there is considered the case wherein signal input E can only vary within a range of positive values, as apparent from the graph of Fig. 5 which generally may be interpreted in a similar manner as Fig. 3.

The characteristic curve *d*2 of diode 16 in the graph of Fig. 3. In actual practice U1 is normally of negative value. With the arrangement of Fig. 4 when diode 6 is conducting, the positive signal voltage at 5 is converted into a negative residual voltage and transferred to point 15 with an attenuation due to resistance 14, and it is this negative residual value which makes diode 26 conducting and carries the earth potential to point 15.

Generally, a single additional diode will suffice practically to provide an improved switch according to the invention, but it is apparent that the arrangement could be repeated, and, if required, one or several further diodes can be connected along the resistance attenuator, all these diodes being controlled substantially simultaneously with respect to their conducting and non-conducting states.

In case an electronic switch according to the invention is used for the purpose of limiting a varying signal voltage only, all control means separate from the electronic switch may be omitted and suitable bias voltages of constant values are then applied to both diode electrodes not connected to the attenuator. The incoming signal will be transmitted up or down to a critical value for which the first diode becomes conducting. At the same time the second diode is also brought to its conducting state, and in this condition the output voltage from the attenuator will be determined by the selected potential value of the bias applied to the second diode element.

On the other hand, in case the switch will have to be externally controlled through a change-over of the voltages applied to its diode elements, or at least on the first diode in the direction of transmission of the attenuator, such a change-over is advantageously achieved through purely electronic means. The diagrams of Figs. 6 and 7 illustrate two such electronic change-over controls for arrangements corresponding to those of Figs. 2 and 4 respectively.

Figure 6:
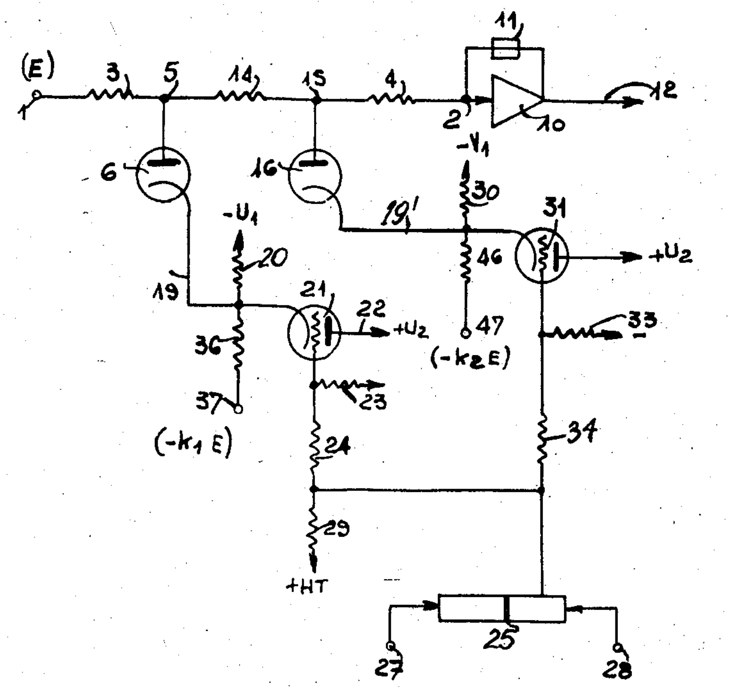
Fig. 6 illustrates an electronic control arrangement for an electronic switch of the kind shown in Fig. 2.
Figure 7:
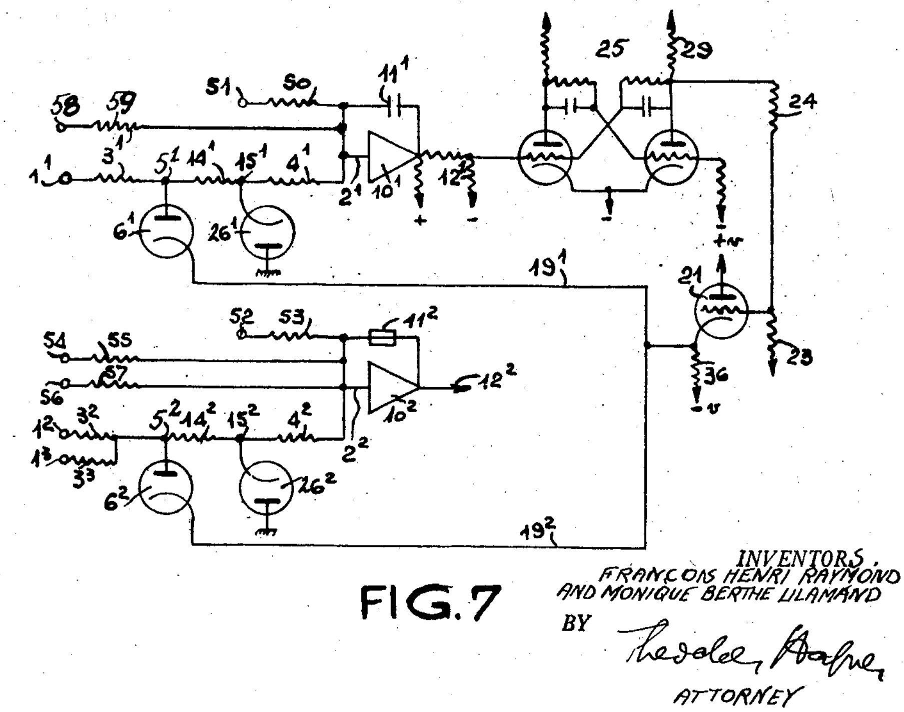
Fig. 7 illustrates an analogue device including two electronic switches of the kind shown in Fig. 4.

In Figs. 6 and 7 there are further developed certain auxiliary features which may be embodied in electronic switches according to the invention.

Referring to Fig. 6, the cathode of diode 6 is connected through the conductor or lead 19 to the cathode of a vacuum tube 21 which is a triode cathode follower tube. Cathode load resistance 20 of tube 21 is negatively biased to value —U1 and the plate 22 of tube 21 is positively biased to value +U2. When this cathode follower tube 21 is non-conducting, voltage U1 will be supplied to lead 19, and when tube 21 is conducting, lead 19 will receive voltage U2. Obviously these terms U1 and U2 are to be interpreted in terms of the actual voltages which must be present on the cathode of diode 6.

In a similar way, the cathode of the second diode 16 is connected through a lead 19' to the cathode of a second cathode follower tube 31. The negative bias of the cathode tube 3, through resistance 30, is of a value V1, and its high voltage plate supply is of the above mentioned value U2. When tube 31 is non-conducting, voltage V1 is fed to diode 16 and renders this diode conducting. When tube 31 is conducting, it is the blocking voltage U2 which is applied to the cathode of diode element 16 of the switch.

Both cathode follower tubes 21 and 31 must be controlled substantially simultaneously from one of their states to the other one, and conversely. For this purpose, use is made of a bistable flip-flop or trigger stage 25 of any classical design, as for example more fully disclosed in Fig. 7.

Trigger stage 25 is controlled from the relative potential conditions of its inputs 27 and 28 to its control grids. One of the plate outputs of stage 25 is connected through series resistors 24 and 34, to the control grids of the cathode follower tubes 21 and 31. At 29, there is shown the plate resistance of the corresponding output of trigger stage 25. Negative bias resistances 23 and 33 are shown for the respective control grids of the tubes 21 and 31. These control grids receive each their potentials from a voltage divider, and their tubes will be conducting when no other current is drawn from the voltage dividers and non-conducting when another current (e.g. through the corresponding tube of the trigger stage) exists.

In case the cathode follower tubes are blocked, voltages U1 and V1 respectively are applied to the cathodes of diodes 6 and 16, and these diodes conduct. Currents are then established through resistances 20 and 30 and these currents fluctuate in relation to the fluctuations of the residual voltages at points 5 and 15. Consequently voltages U1 and V1 will fluctuate and the characteristic curves *d*1 and *d*2, Fig. 3, will also fluctuate on either side of their positions shown.

In order to eliminate such fluctuations and to increase the accuracy of compensation of residual voltage of the switch, auxiliary compensation is provided. In this case incoming signal E is applied to the cathodes of tubes 21 and 31 with a polarity opposite to that applied to input terminal 1, and with an amplitude suitably reduced to compensate for the fluctuations of potential across resistances 20 and 30. As illustrated in Fig. 6, a terminal 37 receives voltage $-k_1$.E and transmits this signal portion to the cathode of tube 21 through a resistance 36; a terminal 47 receives voltage $-k_2$.E and transmits this signal portion to the cathode of tube 31 through a resistance 46.

Such auxiliary compensation may also be used in switches of the type shown in Fig. 4. It will be apparent that the signal components applied to the diodes will not have any unblocking effect when the diodes are blocked if value U2 is so selected as to avoid such risk of unblocking.

Fig. 7 illustrates an embodiment of an analogue multiplier device or the like wherein two electronic switches according to Fig. 4 are included and actuated from a single control trigger stage. This multiplier is adapted to operate according to well-known principles whereby one of the variable simulating voltages is time-divided under control of a rectangular wave-form which has been previously pulse position modulated by the other variable simulating voltage. Consequently the means or average component of the waveform finally obtained is proportional to the product value of these two variables.

In Fig. 7, parts 10[1] and 10[2] designate two high gain amplifiers of the D.C. type, each for example consisting of three cascade amplification stages. Conventional means may be included to prevent the drifts of their D.C. supplies. Amplifier 10[1] is provided with a capacitive feedback 11[1] so that it operates as an electrical integrator, the output of which is always proportional to the integral value of its input. Amplifier 10[2] is similarly provided with a negative feedback loop and, according to whether impedance 11[2] is resistive or capacitive, it will operate as a mere summing amplifier or as a summing and integrating amplifier. In the first case, the amplifier will deliver a voltage representing the product of the quantities concerned and in the second case, the integral of this product.

Input 2[1] of amplifier 10[1] receives three voltages from the following network: a first resistor 50, of high impedance value receives from its input terminal 51 the first variable voltage X; a second resistor 59 of the same value receives from its input terminal a reference constant potential $E_0$ of a negative polarity; a series attenuator 3[1]–14[1]–4[1], of an overall value equal to each one of the two resistances 50 and 59, receives from its input terminal 1[1] a reference voltage of positive polarity and of a value $2E^0$. This attenuator network forms part of a first electronic switch of the kind shown in Fig. 4, and is provided with a first diode 6[1] connected at point 5[1] and a second diode 26[1] connected at point 15[1]. The anode of diode 26[1] is grounded. The cathode of the first diode is connected by conductor 19[1] to the cathode of cathode follower tube 21, the biasing resistor 36 of which receives voltage —U1, the plate of which receives potential +U2. The control grid of tube 21 is biased through resistor 23 and connected by series resistor 24 to one of the plate outputs of a bistable trigger stage 25. One of the control grids of trigger stage is fixedly biased, and the other is connected to the output of amplifier 10[1] through a suitable voltage divider 12[1].

When amplifier 10[1] is at rest, its output potential is high and this ensures the conducting state of the left-hand tube of the flip-flop stage 25. The right-hand tube is off; cathode-follower tube 21 conducts and blocking voltage U2 is applied to diode 6[1]. When a signal develops across input terminal 51, the output from the amplifier decreases to such a point that it can no longer counterbalance the negative bias of the left-hand tube of trigger state 25. This left-hand tube is blocked and the right-hand tube is turned on. Cathode follower tube 21 is blocked and voltage —U1, is applied to the cathode of diode 6[1], causing it to conduct. As —U1 is substantially equal to $-2E_0$, the negative residual voltage as appearing at point 15[1] turns on diode 26[1] so that point 15[1] substantially assumes ground potential. The signal at 2[1] which was $X+E_0$ then becomes $X-E_0$. The output from amplifier 10[1] increases until the point is reached when the left-hand tube of the flip-flop is again turned on. This turns off the right-hand tube and blocks the diodes; and so forth.

Amplifier 10[2], on the other hand, receives as its input signal at 2[2] the combination of the following four input voltages: $-E_0$ from terminal 52 through a high value resistor 53: —K1.X from terminal 54 through a resistance 55 of the same high value; —½Y from terminal 56 through a resistor 57 also of this value; and through attenuator network comprising two parallel resistors $3^3$ and $3^2$ and two, serially connected, the resistances $14^2$ and $4^2$, the combined voltage $2E_0 \pm Y$ from the respective input terminals $1^2$ and $1^3$. $2E_0$ is a positive potential always higher than the arithmetical value of the algebraically varying potential ±Y. The overall resistance of the network is equal to the value of any one of the resistors 53, 55 and 57. At point $5^2$ of this network diode $6^2$ is connected and at point $15^2$, diode $26^2$. The connections of these diodes are substantially identical with those disclosed for the diodes of the first switching arrangement; diodes $6^2$ and $26^2$ are controlled from trigger stage 25 and cathode follower tube 21 substantially simultaneously with diodes $6^1$ and $26^1$ of the first switch.

Consequently, the value of voltages alternatingly transmitted through the second electronic switch are $2E_0 \pm Y$ and $0\theta$, respectively.

Denoting by the variable voltage ±Y, by $t1$ any time interval during which diodes 6 and 26 of both switches are blocked, and by $t2$ any time interval during which these diodes are conducting, the output signal at $12^2$ will represent the following quantity $$\text{(i)} \qquad S = \frac{t1}{t1+t2} \cdot (2E_o + Y)$$

Denoting by U the amplitude of variation of the output signal from $10^1$, always constant for the actuation of the flip-flop stage 25, $t1$ and $t2$ are given by the following relations:

$$\text{(ii)} \qquad t1 = \frac{U}{E_o - X}$$

$$\text{(iii)} \qquad t2 = \frac{U}{E_o + X}$$

Substituting in relation (i), the values of $t1$ and $t2$ given by relations (ii) and (iii), then results:

$$\text{(iv)} \qquad S = \frac{U/(E_o - X)}{U/(E_o - X) + U/(E_o + X)} \cdot (2E_o + Y)$$

and this gives for the final output signal S, the following relation:

$$\text{(v)} \qquad S = \tfrac{1}{2}Y + \frac{X.Y}{2E_o} + E_o + X$$

Since corrective voltages $-E_0$, —½Y, —K1.X are introduced in the input of the amplifier $10^2$ (K1 being an experimentally determined coefficient), the true signal S is:

$$\text{(vi)} \qquad S = \frac{X.Y}{2E_o}$$

which is proportional to the product of the two variable quantities X and Y, as required.

It is apparent from further consideration of the electronic switch including attenuator $3^2$—$14^2$—$4^2$ and diodes $6^2$ and $26^2$ that, notwithstanding an appropriate selection of U1, a fluctuating residual voltage will remain at point $5^2$. This value of U1 must be such that it stands at the midpoint of the range of variation of the signal at $5^2$ and, since Y can vary in both polarities within substantially a wide range, accuracy of switching will depend upon the additional reduction of this fluctuation due to the provision in this switch, according to the invention, of a second diode $26^2$. In the first switch, the provision of diode $26^1$ similarly permits reduction of the residual constant voltage which may be of substantial value since U1 is imposed by the second variable Y and not really selected in accordance with X.

Residual voltages with fluctuation reduced by the provision of electronic switches according to the invention may be compensated by opposing voltages in the following way.

From a test during which only the three terminals 1 of the arrangement are fed, the values $d1$ and $d2$ of these residual voltages are determined at terminals $2^1$ and $2^2$. Then corresponding voltages D1 and D2 are introduced, respectively, at terminals $1^1$ and $1^3$, mixed with the reference voltages applied to these terminals. These voltages are of negative polarities, so they can be denoted by —D1 and —D2 and their values take into account the attenuations of the resistances through which they will be seen from terminals $2^1$ and $2^2$. In the first channel further, a voltage +D1 will also be introduced at 58. Consequently both voltages —D1 and +D1 will cancel each other as long as diodes $6^1$ and $26^1$ will be non-conducting. As soon as these diodes conduct, compensation voltage +D1 alone operates to cancel residual voltage $d1$, as seen at the output of attenuator $3^1$—$14^1$—$4^1$. In the second channel, a voltage +D2/2 will be applied to terminal 52, together with voltage $-E_0$. Further, it will be further noted from the above calculations that voltage —K1.X must be modified by the addition of a voltage equal to K1.X.(D2/$2E_0$). This latter voltage may be obtained, as known per se, from the slider of a potentiometer receiving voltage K1.X across its terminals and having this slider so adjusted as to impose an attenuation ratio by D2/$2E_0$ to this voltage.

We claim:

1. An electronic switch comprising in combination a series resistance attenuator, means for applying to one end thereof an electric input signal to be derived with a predetermined attenuation at the other end thereof, a diode element having one of its electrodes connected to an intermediate point of said attenuator, at least one further diode element having one of its electrodes connected to a further point of said attenuator which is below the first in the direction of transmission, and separate means for selectively biasing both diode elements to be substantially simultaneously non-conducting and substantially simultaneously conducting, respectively; the latter means including means for biasing said diode elements differentially so as to reduce the residual voltage at said further diode element with respect to that at the first diode element.

2. An electronic switch according to claim 1 comprising a source of constant voltage connected to compensate said reduced residual fluctuation, said differential biasing means being adjusted to further reduce said residual fluctuation to such a value as to be substantially cancelled by said compensating voltage irrespective of the possible fluctuations of the residual voltage on either side of an average value.

3. An electronic switch according to claim 1 comprising means for applying to the output end of said attenuator a constant voltage when the diode elements are conducting, and also for applying to another point of said attenuator another constant voltage of a polarity opposite to that of said first constant voltage and of such value that said first voltage is substantially cancelled when the diode elements are non-conducting.

4. An electronic switch according to claim 3, wherein said means for applying a constant voltage to the output end of said attenuator include an input terminal to which said voltage is applied, a further series resistance through which it is attenuated, and which has substantially the same value of resistance as said first attenuator, and the other end of which is connected to the output end of said first attenuator.

5. An electronic switch according to claim 1 comprising means for mixing in said attenuator the electric signal to be transmitted with a reference voltage of such value that the resulting voltage always remains of a single predetermined polarity in the path extending from said first diode connection to the output end, and further means for applying to said output end at least part of said reference voltage in such a polarity as at least partially to cancel a portion of the output signal corresponding to said reference voltage.

6. An electronic switch according to claim 5 wherein said attenuator includes a pair of mixing resistances connected in parallel to said first diode connection, comprising means for applying to said parallel resistances input signal and reference voltage respectively.

7. An electronic switch according to claim 5 wherein said means for applying at the output end of the attenuator a constant voltage compensating at least partially said reference voltage includes an input terminal for said constant voltage and a series resistance from said input terminal to the output end of the attenuator, of such a value as to attenuate the input voltage applied from said input terminal.

8. An electronic switch according to claim 1 to operate upon fluctuating input signals, comprising a biasing terminal for at least one of said diode elements and means for feeding to said biasing terminal an attenuated component of the output voltage of a polarity reversed with respect to that of the input signals of the attenuator.

9. An electronic switch according to claim 8, wherein said feeding means include at least an input terminal for the application thereto of signal voltage of reversed polarity, and an attenuating series resistance extending therefrom to said biasing terminal in parallel with a biasing resistance therefor.

10. An electronic switch according to claim 1, wherein at least one of said biasing means includes change-over means for controlling at least the first diode element of the switch from its conducting state to its non-conducting state and conversely.

11. An electronic switch according to claim 10, wherein all said diode elements include biasing terminals and are of the same direction between the connecting points of the attenuator and said biasing terminals, and wherein said change-over means control the biasing voltage values for all said diode elements substantially simultaneously.

12. An electronic switch according to claim 10, wherein said first diode element only is controlled from said change-over means and is of a direction opposite to that of any other diode element in said switch said other diode element receiving a constant biasing voltage, and said first diode element being so controlled by said change-over means that the residual voltage therefrom, when conducting, insures the corresponding change-over of conditions of the other diode elements of the switch.

13. An electronic switch comprising in combination a series resistance attenuator, means for applying to one end thereof an electric input signal to be derived with a predetermined attenuation at the other end thereof, a diode element having one of its electrodes connected to an intermediate point of said attenuator, means for biasing the diode element to block said signal apart from a residual voltage due to signal fluctuation, at least one further diode element having one of its electrodes connected to a further point of said attenuator which is below the first in the direction of transmission, and further means for biasing the other electrode of said further diode element in predetermined amplitude relation to said first biasing means to at least further reduce the residual voltage from the first diode element, at least one of said biasing means including change-over means for controlling at least the first diode element of the switch from its conducting state to its non-conducting state and conversely, said change-over means including at least a bistable flip flop stage, and a cathode follower stage having an input controlled from one output of the flip flop stage; said cathode follower stage receiving a cathode bias voltage such that, when blocked, the corresponding diode element of the switch is made conducting, and receiving a plate voltage such that, when unblocked, the corresponding diode element of the switch is made non-conducting; there being provided input means for controlling the flip flop stage from one of its conditions to the other.

14. An electronic switch according to claim 13, wherein there are provided as many cathode follower stages as there are diode elements in the switch, each cathode follower stage being controlled from said single flip flop stage and each being adapted to receive cathode and plate voltages determined by the corresponding diode element to be controlled therefrom.

15. In an electronic switching apparatus, attenuating means including a series resistance, means for applying a signal to the input end of said attenuating means, means for receiving an attenuated signal from the output of said attenuating means, a number of diode elements, each of said diode elements having one of its electrodes connected to one point along said series resistance; the points along said series resistance being predeterminedly spaced; biasing means including biasing terminals connected to the other one of said electrodes, and means for applying to said biasing terminals a corresponding number of biasing voltages substantially simultaneously to transfer the diode elements substantially simultaneously from their conducting states to their non-conducting states and conversely; said biasing voltages in the conducting states of said diodes being adjusted to reduce the residual voltage of at least one of the diodes farther from said input end with respect to the residual voltage of at least one diode closer to said input end.

16. Apparatus according to claim 15, wherein at least part of said biasing voltage applying means is under control of the signal.

17. In an electronic switching apparatus, signal attenuating means forming a series resistance path, means for applying pulse signals at one end of said path, means for receiving attenuated signals at the other end of said path, a number of diode elements having one of their electrode points connected respectively to predetermined points along said series resistance path; and means under control of pulse signals for biasing the other diode electrodes substantially simultaneously; said biasing means including means for transferring the diode elements simultaneously from their conducting states to their non-conducting states and conversely, and means for biasing said elements in their conducting states differentially so as to reduce the residual voltage of at least one diode element farther from the first end of said resistance path with respect to that of at least one diode element closer to said first end of said resistance path.

18. An electronic switch according to claim 17 comprising means under control of pulse signals for applying to the output end of said attenuating means a voltage when the diode elements are conducting, and for applying to another point of said attenuator another voltage of a polarity opposite to that of said first voltage and of such value that said first voltage is substantially cancelled when the diode elements are non-conducting.

19. An electronic switch according to claim 17 comprising means for mixing in said attenuating means the pulse signals to be transmitted with a reference voltage of such value that the resulting voltage always remains of a single predetermined polarity in the path extending from the first diode connection to the output end of said attenuating means, and means for applying to said output end at least part of said reference voltage in such a polarity as at least partially to cancel a portion of the output signal corresponding to said reference voltage.

20. An electronic switch according to claim 17 to operate upon fluctuating input signals, wherein said biasing means include a biasing terminal for at least one of said diode elements, and means for feeding to said biasing terminal an attenuated component of the output voltage of a polarity reversed with respect to that of the input signal of the attenuator.

21. An electronic switch according to claim 17, wherein all said diode elements are of the same direction, and said biasing means include change-over means for controlling the biasing voltage values for all said diode elements substantially simultaneously.

22. An electronic switch according to claim 17, wherein said biasing means include change-over means for controlling the biasing voltage of at least the first diode element of the switch; said first diode element being of a direction opposite to at least one other diode element in said switch, and being so controlled by said change-over means that the residual voltage therefrom, when conducting, insures the corresponding change-over of conditions of the other diode elements of the switch.

References Cited in the file of this patent

UNITED STATES PATENTS

| | | |
|---|---|---|
| 2,434,929 | Holland et al. | Jan. 27, 1948 |
| 2,535,303 | Lewis | Dec. 26, 1950 |
| 2,548,913 | Schreiner et al. | Apr. 17, 1951 |
| 2,583,146 | Jacob | Jan. 22, 1952 |
| 2,632,046 | Goldberg | Mar. 17, 1953 |
| 2,658,180 | De Boisblanc | Nov. 3, 1953 |
| 2,697,201 | Harder | Dec. 14, 1954 |
| 2,700,731 | Crayford | Jan. 25, 1955 |
| 2,731,557 | Clayden | Jan. 17, 1956 |
| 2,769,137 | Creusere | Nov. 13, 1956 |

FOREIGN PATENTS

| | | |
|---|---|---|
| 336,550 | Italy | Feb. 18, 1936 |

OTHER REFERENCES

"An Analogue Multiplier," Nature, January 1951.

"A Square Root Law Circuit," by I. G. Baxter, March 1954.